Patented Sept. 7, 1943

2,328,755

UNITED STATES PATENT OFFICE 2,328,755

CONVERSION OF OLEFINIC HYDROCARBONS

Charles L. Thomas, Chicago, Ill., assignor to Universal Oil Products Company, Chicago, Ill., a corporation of Delaware No Drawing. Application June 30, 1939, Serial No. 282,071

14 Claims. (Cl. 196—52)

This invention relates to the conversion of normally liquid olefinic hydrocarbons, such as, for example, those of gasoline boiling range such as may be obtained by the catalytic polymerization of gaseous olefins.

In a more specific sense the invention is concerned with a modification of olefin conversion processes involving the use of particular and specific types of catalysts which function selectively to promote the formation of saturated, low boiling gasoline fractions.

The art of thermally reforming gasolines and naphthas to produce primarily gasoline of high octane number is extensive and it is recognized that many of the basic principles of such thermal conversion reactions of hydrocarbons are known and that particular commercial processes have been developed which embody these principles. The application of catalysts, however, in hydrocarbon reforming operations is practically upon the same basis as it is in other fields; that is, the knowledge of what catalyst to employ when reforming different hydrocarbon fractions is largely empirical and admits of no generalizations. A large number of catalysts have a tendency to accelerate olefin decomposition reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This decomposition of carbonaceous materials is many times related to the type of decomposition reactions selectively fostered by the catalyst and in general it may be said that very few, if any, catalysts which have been tried thus far in olefin conversion reactions have reached a commercial status.

The present invention relates to the use of catalytic materials which are specially adapted to accelerate the production of saturated gasoline boiling range fractions from olefinic materials, such as the polymers of gaseous mono-olefins or normally liquid olefinic hydrocarbons derived from any other source. The preferred catalysts are characterized by selectivity in promoting the reactions of the process, by their refractory character which enables them to retain their catalytic properties through many repeated periods of use and reactivation under severe conditions of temperature, by their ease and simplicity of manufacture, and by their exact reproducibility.

In one specific embodiment the present invention comprises a process for producing gasoline containing relatively low amounts of olefins by subjecting normally liquid olefinic hydrocarbons to contact, at a temperature in the approximate range of 500–900° F. with granular catalytic material comprising a mass formed by calcining an alkali metal-free composite of precipitated silica hydrogel and a minor amount of a hydrogel selected from the group consisting of hydrogels of alumina and zirconia.

In a further embodiment the catalytic material may comprise a mass formed by washing, drying, forming into particles, and calcining a synthetically prepared composite of hydrogels of silica, alumina, and zirconia.

In the following specification the terms "silica-alumina, silica-zirconia, and silica-alumina-zirconia" masses are used in a broad sense. Inasmuch as the chemical knowledge of the solid state has not been developed perfectly, it is not possible to give the structure of all solid substances. All that can be said definitely concerning these masses is that they contain silicon, oxygen, aluminum, and/or zirconium in combination. Generally speaking, however, all these components indicate more or less low catalytic activity individually but in the aggregate display high activity. This activity is not an additive function, it being relatively constant for a wide range of proportions of the components, whether in molecular or fractions of molecular proportions. No one component can be determined as the one component for which the remaining components may be considered as the promoters according to conventional terminology, nor can any components be determined as the support and the others the catalyst proper.

According to the present invention normally liquid olefinic hydrocarbons from any source, such as polymers of normally gaseous or of relatively low boiling normally liquid olefins are converted to a substantial degree into essentially saturated hydrocarbons by contact at a temperature of the approximate order of 500–900° F. under substantially atmospheric pressure with a catalytic material produced preferably by precipitating alumina hydrogel and/or zirconia hydrogel upon a relatively pure salt-free silica hydrogel, following by washing to remove water soluble salts, drying to remove a major portion of combined or adsorbed water, and calcining at a temperature in the approximate range of 1000–1500° F. A superatmospheric pressure up to approximately 1000 pounds per square inch may also be employed in the production of a hydrocarbon product containing relatively small amounts of olefins.

In the finished catalysts, prepared as indicated above, the weight ratio of silica to alumina and/or zirconia may vary within a considerable range, for example from 30 to 0.1, although as a rule catalyst composites have optimum activity based on yields and quality of gasoline, and the amounts of readily polymerizable gaseous olefins produced will correspond to silica-oxide weight ratios of the order of about 30 to 10 in which the term "oxide" is used in reference to alumina and/or zirconia. These proportions will vary considerably with the particular hydrocarbon fractions subjected to catalytic contact and the degree of conversion desired in any particular case.

It is to be recognized that very little is known positively concerning the mechanism of enhanced activity in complex catalysts and no attempt will be made herein to offer any definite reasons for the observed mutually promotional effect of silica with alumina and/or zirconia composites prepared for catalytic hydrocarbon conversion purposes according to the present invention. There may be a catalytic effect due to the juxtaposition of the catalyst components and it may be that the oxide (alumina and/or zirconia) is the more active catalyst and is extensively dispersed in and on the silica in order to present a large surface.

In manufacturing the preferred catalysts in accordance with the present process it is necessary to employ silica which has been prepared by precipitation from solution as a hydrogel within or upon which the alumina and/or zirconia are deposited also by precipitation as hydrogels. The most convenient and ordinary method of preparation of a satisfactory silica gel is to acidify an aqueous solution of sodium silicate by the addition of the required amount of hydrochloric acid. The excess of acid and the concentration of the solution in which the precipitation is brought about will determine the eventual primary activity of the silica and its suitability for compositing with the alumina and/or zirconia hydrogels to produce a catalyst of high activity. In general, the most active silica is produced by adding only enough acid to cause gel formation to occur in the sodium silicate, but the material formed at such a point is rather gelatinous and is filtered with difficulty. Further, the silica hydrogel is coagulated incompletely at this point. By adding a moderate excess of acid after the hydrogel has formed, the more desirable physical characteristics in regard to catalyst activity are conserved while the "filtrability" is generally improved and the silica hydrogel is precipitated more completely. Fairly good hydrated silica for present catalytic purposes may be made by employing as high as a 20% excess of hydrochloric acid, but beyond this point a part of the more desirable properties are lost.

After precipitating the silica gel it is preferably washed until substantially free from salts by using several alternative reagents, which will be described later. In one mode of preparing the activated form, the silica hydrogel may be boiled either with separately precipitated aluminum hydroxide and/or zirconium hydroxide gel, added in the wet condition to the silica suspension, or the silica hydrogel may be suspended in and boiled within an aluminum salt solution such as, for example, an aqueous solution of aluminum chloride or the silica hydrogel may be treated similarly by an aqueous solution containing both aluminum and zirconium salts. In either case the final precipitate comprising essentially the hydrated silica and hydrated alumina and/or zirconia is finally washed to substantially complete removal of water soluble materials and dried at about 300° F. to produce a rather crumbly and granular material which may be ground and pelleted or sized to produce particles of catalyst. Alternatively the washed composite of silica hydrogel with alumina, zirconia or a mixture of alumina and zirconia hydrogels may be formed into particles, dried, and calcined to produce particles of the active catalyst. This material is then calcined at a temperature in the approximate range of 1000–1500° F.

The necessary hydrogel of alumina or zirconia or a mixture of such gels is preferably deposited on washed alkali metal-free silica hydrogel by adding an alkaline precipitant such as ammonium hydroxide, ammonium carbonate, or ammonium sulfide to aqueous solutions of aluminum and/or zirconium salts, followed by suitable washing to remove impurities. The alumina and/or zirconia hydrogels may be precipitated from such solutions in which previously prepared and washed hydrated silica is suspended, followed by a washing of the total composite precipitate. Similarly, purified silica may be suspended in a solution of an aluminate, such as sodium aluminate, and alumina may be precipitated by the addition of the aluminum salts or by the requisite quantities of acid. As a further alternative method of producing the desired catalysts, aluminum and/or zirconium salts may be added to a solution of an alkali metal silicate to jointly precipitate silica hydrogel with the hydrogels of alumina and/or zirconia and further amounts of silica hydrogel may then be precipitated by the addition of acid. A characteristic equation illustrating the preparation of a silica-alumina catalyst is given below, although in it no account is taken of water of hydration;

$$3Na_2SiO_3 + 2AlCl_3 \rightarrow 6NaCl + Al_2O_3 + 3SiO_2$$

It will be obvious that the employment of the reaction shown in the above equation will be limited on account of the molal proportions involved so that such a method of preparation of a composite may need supplementing by the presence of acid for further precipitation of silica to obtain the desired ratio.

It should be emphasized in the present connection that the catalysts which characterize the process of the invention are essentially composites of substantially pure amorphous silica with amorphous alumina and/or zirconia. Experiments have indicated definitely that distinctly inferior catalytic materials are obtained when either the silica, alumina, and/or zirconia of the composites has any crystalline characteristics. That is, it is not sufficient to precipitate alumina and/or zirconia gel on such natural siliceous materials as powdered quartz or diatomaceous earth however finely divided these materials may be. Similarly inferior catalysts are obtained if any known forms of crystalline alumina and/or zirconia are mixed with a carefully prepared and washed amorphous silica. Silica of some value has been obtained by the hydrolysis of silicon tetrachloride, although that obtained similarly from silicon tetrafluoride was decidedly inferior.

In the preparation of active silica hydrogels from soluble silicates, a series of experiments has further indicated that hydrochloric acid is the best common material to use as a precipitant, although sulfuric acid and other acids give but slightly inferior results. The precipitation is best conducted at approximately normal temperature since tests conducted at temperatures of the order of 200° F. gave a silica gel which was inferior as a component of a silica-alumina composite as measured by the gasoline produced when it was used as a cracking catalyst.

If alkali metal salts are present in sufficient quantities in either the originally precipitated silica gel or in the final catalyst composite, catalysts are obtained which are not sufficiently active under the usual cracking conditions. If present in smaller quantities, catalysts may be obtained which are active in the early stages of use but lose their activity during the elevated temperatures reached in regeneration by burning off carbonaceous deposits in a stream of air or of other oxygen-containing gas. Catalysts which contain still less sodium may be heated up to 1500–1600° F. during regeneration without loss of activity. For these reasons special washes are preferably used which are capable of removing these sodium compounds from the catalyst so that only quite minute amounts remain since it has been found that this sodium could not be washed out entirely with water alone. The washes developed are dilute hydrochloric acid, ammonium chloride, and aluminum chloride solutions. These washes serve to displace the sodium in the catalyst so that additional water washing can remove the sodium. For economic reasons hydrochloric acid and/or aluminum chloride seem to be both preferable to ammonium chloride, although ammonium chloride seems also to be slightly inferior in its effectiveness.

Catalysts prepared for the process by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that catalysts may be reactivated and reused for long periods of time.

According to the present process catalysts prepared by the general procedure described in the preceding paragraphs are utilized to the best advantage as reactor filling materials in the form of small pellets or granules. In the majority of cases wherein hydrocarbon fractions readily vaporizable at moderate temperatures without excessive decomposition are employed, the average particle size is within the range of 6–10 mesh which may apply either to small pellets of uniform size and short cylindrical shape or to particles of irregular size and shape produced by the grinding and sizing of the partly dehydrated materials.

While the simple method of preheating a given fraction of olefinic hydrocarbon vapors to a temperature suitable for their conversion in contact with the catalysts and then passing the vapors over a stationary mass of catalyst particles contained in a cylindrical chamber (preferably vertical) may be employed in some cases, it is usually preferable to pass the preheated vapors through banks of relatively small diameter catalyst-containing tubes in multiple connection between headers, since this arrangement of apparatus is better adapted to permit exterior heating of the catalyst tubes to compensate for the heat loss in the conversion reactions. After the passage of the liquid olefinic hydrocarbons over the catalyst, the products may be separated into gasoline boiling range materials, a higher boiling fraction (which may be recycled to further contact with the catalyst), heavy residual materials, and gases containing a considerable proportion of polymerizable olefinic hydrocarbons. The catalyst may also be utilized in the form of powder which is mixed with the oil and passed through reactors under conditions of temperature, pressure, and time adequate to give good conversion to saturated gasoline.

As the activity of the catalyst for producing a hydrocarbon fraction containing relatively low amounts of olefin, decreases rapidly with use and is highest when fresh or freshly reactivated, this invention is carried out preferably by utilizing catalyst reactors in duplicate so that the cycle of operation may consist of alternate short periods of olefin reforming and of reactivation by burning off carbonaceous material in an atmosphere of an oxygen-containing gas. Powdered catalyst which has become spent by use may be withdrawn from and reactivated outside of the hydrocarbon conversion system after which it may be returned to the catalytic reactor with oil to be contacted therein.

The present process, besides being characterized by the use of novel catalysts, is further characterized by the use of a relatively low temperature and the production of a good yield of gasoline containing relatively small amounts of olefins and having a relatively high octane number which may be increased readily by the addition of lead tetraethyl. This essentially saturated gasoline containing a relatively high proportion of paraffinic and aromatic hydrocarbons has a blending octane number which is practically the same as its actual octane number, but because of its good lead susceptibility it is a useful base for the production of high antiknock aviation fuel.

Catalytic treatment of olefinic hydrocarbons of the nature of mono-olefine polymers, at a temperature in the approximate range of 500–900° F. using a liquid space velocity of the order of 0.5–5.0 produces a relatively high yield of gasoline with a relatively low olefin content. The saturated nature of the gasoline so produced by the process of this invention is increased when the conversion is effected under a superatmospheric pressure up to approximately 1000 pounds per square inch.

I have found further that a gasoline of an essentially saturated nature is formed under the above mentioned conditions when the rate of charging of the normally liquid olefinic material is so controlled that the conversion to gasoline in one pass through the catalyst is less than approximately 30 volume percent of the material charged. For the production of high quality aviation gasoline the conversion thereto is restricted preferably to 10–15 volume percent per pass through the catalyst. The unconverted olefinic material may then be recycled until the total conversion to essentially saturated gasoline is 50–80% of the charge. Under these conditions of small conversions per pass the proportion of olefins in the product is greatly reduced producing a gasoline suitable for aviation use.

The formation of gasoline containing relatively low amounts of olefins during catalytic conversion of olefinic hydrocarbons of the nature of olefin polymers probably involves several steps including isomerization, cyclization, dehydrogenation, and hydrogenation reactions, although this mechanistic concept should not be misconstrued as to limit the scope of the invention. It appears that isomerization and cyclization of olefins to hydro-aromatic hydrocarbons represents the first of these reactions. The hydro-aromatics resulting from such cyclization reactions then undergo dehydrogenation in the presence of the silica-base catalysts to form aromatic hydrocarbons and the hydrogen so liberated presumably in an activated state may combine with a portion of the unconverted olefins present in the reaction mixture and thereby convert them into paraffinic hydrocarbons. Thus in a mixture of butene polymers comprising both dimethylhexenes and trimethylpentenes the former are cyclized and dehydrogenated to xylenes and the trimethylpentenes are hydrogenated to trimethylpentanes with the result that the total mixture so produced has an octane number of approximately 100.

Under the conditions of the invention the catalyst apparently has the ability not only of aiding cyclization of olefins into hydro-aromatics but also of acting as an agent for transferring hydrogen from such newly formed hydro-aromatics to the olefinic hydrocarbons, thereby forming a product consisting mainly of paraffins and aromatics. As some hydrogen normally escapes with the other products when the reactions occur at substantially atmospheric pressure, the application of pressure to this reaction exerts a beneficial effect upon hydrogenation and favors the production of a high yield of paraffinic hydrocarbons.

A specific and satisfactory method of preparing silica-base catalysts and using them in accordance with the present invention is given below, although not with the intention of unduly limiting the proper scope of the invention. By following the procedure outlined with a suitable choice of reagents of accepted purity, good catalysts for nearly all olefin conversion reactions may be produced.

*Example 1.*—In preparing the catalyst an aqueous solution of sodium silicate analyzing approximately 9% by weight of sodium oxide and 28.5% silicon dioxide with the impurities such as magnesium oxide, calcium oxide, ferrous oxide, titanium oxide and aluminum oxide being of the order of 0.1% or less was diluted with 10 volumes of distilled water, although certain other types of sufficiently pure water may be employed. Then hydrochloric acid was added slowly during constant agitation of the solution until the mixture was just barely alkaline to phenolphthalein, the temperature being within the approximate range of 60–90° F. After the silica gel was formed and had been well broken up, a small additional amount of hydrochloric acid was added until the mixture was just acid to Congo red, after which it was brought back practically to a neutral point when tested with litmus and charged to a centrifugal type of filter. The material on the filter was water washed until the filtrate no longer gave a test for sodium with magnesium uranyl acetate regent, after which a further wash was given with an aluminum chloride solution in an amount equivalent to one part by weight of aluminum chloride hexahydrate to 16.5 parts by weight of the original sodium silicate. The cake on the filter was again water washed until the filtrate gave no test for sodium after which the filter cake was removed, broken up and slurried with aluminum chloride solution to a point permitting easy pumping. The aluminum chloride added to the slurry was in an amount sufficient to give the desired final composition, for example, $100SiO_2:10Al_2O_3$. Ammonium hydroxide was then added to the slurry until the mixture was just barely acid to litmus after which the washed material was again charged to a filter and washed until there was no test for sodium in the filtrate. The filter cake was then removed and dried to a water content of about 20% after which it was ground until all passed a 30-mesh screen and a minimum passed a 60-mesh screen. This mixture was then pilled and the pills were calcined at 1500° F. for about one hour to stabilize them in respect to subsequent exposure to temperatures of this order which are used in the alternate reactivation steps practiced in olefin reforming operations using such catalysts.

A silica-alumina composite, prepared by the general procedure outlined above in which the components had the ratio of 100 molar proportions of silica and 10 molar proportions of alumina, was used in the form of 3 $x$ 3 mm. pellets as a filler in tubes through which an octene fraction with 136 bromine number formed by the mixed polymerization of isobutene and normal butene was passed at 700° F. under a pressure of 100 pounds pressure per square inch using a liquid space velocity of one. During a period of two hours, liquid products were recovered equivalent to 74% by volume of the charge and gases were formed corresponding to 353 cubic feet per barrel of charge. The gasoline yields and bromine numbers obtained during various half-hour intervals of the run are given in Table 1.

TABLE 1

*Catalytic conversion of butene dimers*

| Period of 0.5 hr. on test | 300° F., E. P. gasoline | | 400° F., E. P. gasoline |
|---|---|---|---|
| | Volume per cent of charge | Bromine number | Volume per cent of charge |
| 1 | 61 | 10 | 76 |
| 2 | 64 | 73 | 73 |
| 3 | 64 | 117 | 71 |
| 4 | 65 | 112 | 70 |

The 300° F. end point gasoline formed during the first 0.5 hour on test was found to contain 8% olefins, 22% aromatics, and 70% paraffins, naphthenes being absent.

The gas formed during the 2-hour test period had the following composition:

| | |
|---|---|
| Hydrogen | 2.6 |
| Methane | 5.4 |
| Ethylene | 0.7 |
| Ethane | 1.9 |
| Propene | 8.7 |
| Propane | 5.5 |
| Isobutene | 13.5 |
| n-Butene | 6.2 |
| Butanes | 45.4 |
| $C_5+$ | 10.1 |
| | 100.0 |

The above results show that more saturated products were formed during the first half-hour of the run than were produced after a longer time on test. This tendency to form saturated products was also evidenced by the relatively high butane content of the gas formed.

*Example 2.*—In a similar run a mixture of octenes resulting from the catalytic polymerization of isobutene and normal butene was passed over the $100SiO_2:10Al_2O_3$ catalyst at 700° F. under 100 pounds pressure during a period of one-half hour. The liquid product, formed in an amount equivalent to 62% by volume of the charge was separated from the gaseous products and fractionally distilled into approximately 45° F. fractions. Determination of the aromatic, olefinic, naphthenic, and paraffinic hydrocarbon content of each of these fractions gave the results shown in Table 2.

TABLE 2

*Composition of the liquid product formed in catalytic conversion of butene dimers*

| Fraction No. | Boiling range, °F. | Per cent by weight of the total liquid product ||||
|---|---|---|---|---|---|
| | | Aromatics | Olefins | Naphthenes | Paraffins |
| 1 | To 104 | 0.0 | 0.2 | 0.0 | 11.8 |
| 2 | 104-158 | 0.0 | 0.1 | 0.0 | 12.9 |
| 3 | 158-212 | 1.1 | 0.3 | 0.0 | 12.6 |
| 4 | 212-257 | 4.1 | 0.3 | 0.5 | 12.1 |
| 5 | 257-302 | 7.0 | 0.3 | 0.0 | 5.7 |
| 6 | 302-347 | 10.9 | 0.1 | 0.8 | 2.1 |
| 7 | 347-392 | 6.6 | 0.1 | 1.3 | 0.0 |
| Totals | | 29.7 | 1.4 | 2.6 | 57.2 |
| Residue | | 9.0 ||||
| Loss | | 0.1 ||||

The results given in Table 2 show that paraffinic hydrocarbons were the main constituents boiling below 212° F., which was the initial boiling point of the charging stock. As the boiling range of the fractions of the product increased, the aromatic content of these fractions likewise increased and the paraffin content simultaneously decreased. Olefins and naphthenes were present in minor amounts as indicated.

Upon the basis of the analytical data given, the 300° and 392° F. end point gasoline fractions had the following compositions:

| Weight per cent content of | 300° F., E. P. gasoline | 392° F., E. P. gasoline |
|---|---|---|
| Aromatics | 17.6 | 32.7 |
| Olefins | 1.9 | 1.6 |
| Naphthenes | 0.7 | 2.9 |
| Paraffins | 79.8 | 62.8 |
| | 100.0 | 100.0 |

The highly aromatic nature of the products boiling above 300° F. is especially evident in the fraction boiling from 302 to 392° F., which contained 79% aromatic hydrocarbons.

*Example 3.*—Several runs were made in which normal octene (a mixture of 1-octene and 2-octene obtained by dehydrating capryl alcohol over activated alumina at 800° F.) was passed over the $100SiO_2:10Al_2O_3$ catalyst at 710° F. under substantially atmospheric pressure using 4.1 and 1.0 liquid space velocities, and in one run under 115 pounds absolute pressure with 0.85 liquid space velocity. In each of these runs one volume of octene was passed over unit volume of catalyst before the catalyst was reactivated. A summary of the experimental results including results on the composition of the liquid products is given in Table 3.

TABLE 3

*Catalytic conversion of normal octene at 710° F. in the presence of $100SiO_2:10Al_2O_3$*

| | Pressure, pounds absolute |||
|---|---|---|---|
| | Atmos. | Atmos. | 115 |
| Liquid space velocity | 4.14 | 1.00 | 0.85 |
| Products, per cent by weight of charge: | | | |
| Gas | 11.6 | 27.2 | 12.2 |
| Liquid | 82.4 | 65.4 | 81.0 |
| Carbonaceous deposition on catalyst | 6.0 | 7.4 | 6.8 |
| Composition of liquid products, per cent by weight of the octene charged: | | | |
| Paraffins and naphthenes | 23.5 | 30.0 | 54.5 |
| Olefins | 54.0 | 29.0 | 21.0 |
| Aromatics | 5.0 | 7.0 | 5.5 |
| Aromatics present | (¹) | (²) | (³) |

¹ Toluene, xylenes, and higher.
² Benzene, toluene, xylenes, and higher.
³ Xylenes and higher.

The yield of paraffinic hydrocarbons containing small amounts of naphthenes was increased by using a liquid space velocity of 1.00 over that obtained at 4.14 space velocity at atmospheric pressure and this yield was increased further under 115 pounds absolute pressure when using 0.85 liquid space velocity. It is probable that the carbonaceous deposit on the catalyst included high molecular weight aromatic hydrocarbons, the formation of which made available part of the hydrogen which reacted with octene to produce octane.

The character of the present invention and particularly its commercial value are evident from the preceding specification and limited numerical data presented, although neither section is intended to be unduly limiting in its generally broad scope.

This application is a continuation-in-part of my co-pending application Serial No. 251,947, filed January 20, 1939.

I claim as my invention:

1. A process for treating normally liquid mono-olefins which comprises contacting the same with a calcined composite comprising precipitated silica hydrogel and precipitated alumina hydrogel under conditions such as to convert a substantial portion of the mono-olefins to paraffins.

2. A process for treating normally liquid mono-olefins which comprises contacting the same with a calcined composite comprising precipitated silica hydrogel and precipitated zirconia hydrogel under conditions such as to convert a substantial portion of the mono-olefins to paraffins.

3. A process for treating normally liquid mono-olefins which comprises contacting the same with a calcined composite of precipitated hydrogels of silica, alumina and zirconia under conditions such as to convert a substantial portion of the mono-olefins to paraffins.

4. A process for improving the gasoline boiling, mono-olefinic polymers produced in the polymerization of normally gaseous olefins, which comprises contacting said polymers with a calcined composite comprising precipitated silica hydrogel and precipitated alumina hydrogel under conditions such as to convert a substantial portion of the mono-olefins to paraffins.

5. A process for improving the gasoline boiling, mono-olefinic polymers produced in the polymerization of normally gaseous olefins, which comprises contacting said polymers with a calcined composite comprising precipitated silica hydrogel and precipitated zirconia hydrogel under conditions such as to convert a substantial portion of the mono-olefins to paraffins.

6. A process for improving the gasoline boiling, mono-olefinic polymers produced in the polymerization of normally gaseous olefins, which comprises contacting said polymers with a calcined composite of precipitated hydrogels of silica, alumina and zirconia under conditions such as to convert a substantial portion of the mono-olefins to paraffins.

7. A process for treating octenes which comprises contacting the same with a calcined composite comprising precipitated silica hydrogel and precipitated alumina hydrogel under conditions such as to convert a substantial portion of the octenes to paraffins.

8. A process for treating octenes which comprises contacting the same with a calcined composite comprising precipitated silica hydrogel and precipitated zirconia hydrogel under conditions such as to convert a substantial portion of the octenes to paraffins.

9. A process for treating octenes which comprises contacting the same with a calcined composite of precipitated hydrogels of silica, alumina and zirconia under conditions such as to convert a substantial portion of the octenes to paraffins.

10. A process for treating mono-olefin hydrocarbons boiling in the gasoline range which comprises subjecting the olefins at a temperature in the approximate range of 500–900° F. to the action of a calcined composite comprising precipitated silica hydrogel and precipitated alumina hydrogel for a sufficient time to convert a substantial portion of the olefins into more saturated hydrocarbons.

11. A process for treating mono-olefin hydrocarbons boiling in the gasoline range which comprises subjecting the olefins at a temperature in the approximate range of 500–900° F. to the action of a calcined composite comprising precipitated silica hydrogel and precipitated zirconia hydrogel for a sufficient time to convert a substantial portion of the olefins into more saturated hydrocarbons.

12. The process as defined in claim 10 further characterized in that said composite additionally comprises precipitated zirconia hydrogel.

13. A process for increasing the saturation of mono-olefins boiling in the gasoline range which comprises subjecting the olefins to the action of a calcined composite comprising silica hydrogel and alumina hydrogel at a temperature in the approximate range of 500–900° F. and a liquid space velocity of the order of 0.5–5.0.

14. A process for increasing the saturation of mono-olefins boiling in the gasoline range which comprises subjecting the olefins to the action of a calcined composite comprising silica hydrogel and zirconia hydrogel at a temperature in the approximate range of 500–900° F. and a liquid space velocity of the order of 0.5–5.0.

CHARLES L. THOMAS.